Dec. 19, 1961   HANS-JOACHIM KLEINSCHMIDT   3,013,828
CENTERING SYSTEM FOR RUBBER ELEMENTS OF UNIVERSAL
JOINT SHAFTS AND THE LIKE
Filed Nov. 27, 1959
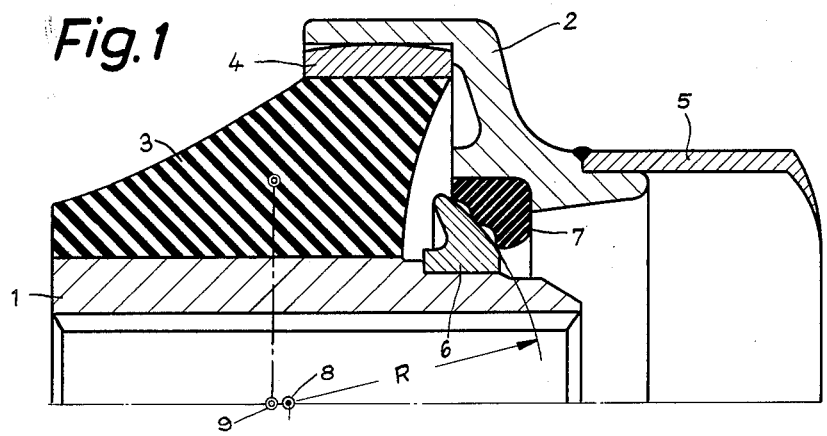
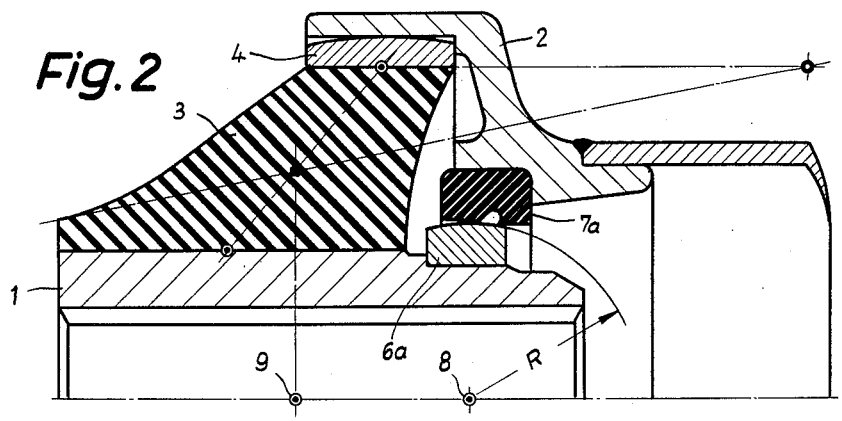
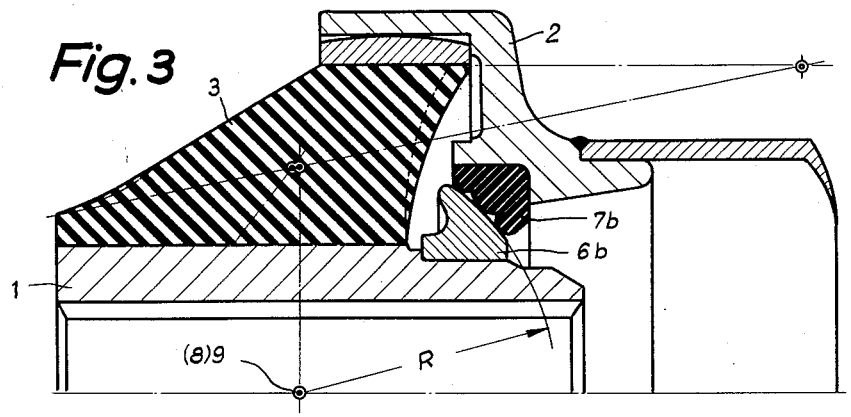
INVENTOR.
Hans-Joachim Kleinschmidt
BY
Patent Agent

United States Patent Office 3,013,828
Patented Dec. 19, 1961

3,013,828
CENTERING SYSTEM FOR RUBBER ELEMENTS OF UNIVERSAL JOINT SHAFTS AND THE LIKE
Hans-Joachim Kleinschmidt, Essen, Germany, assignor to Gelenkwellenbau G.m.b.H., Essen, Germany
Filed Nov. 27, 1959, Ser. No. 855,587
Claims priority, application Germany Dec. 30, 1958
6 Claims. (Cl. 287—85)

The present invention relates to a centering system for rubber elements of universal joint shafts and the like. Heretofore a special centering was not provided for rubber elements of joint shafts but the centering was effected automatically by the rubber elements themselves vulcanized into the universal joint shaft. Such an arrangement, however, frequently leads to a considerable overload on the rubber elements thereby shortening the life thereof. Furthermore, this heretofore known arrangement frequently also leads to an insufficient centering, thereby limiting the speed of rotation of the universal joint shaft and causing oscillations within the various speed ranges.

It is, therefore, an object of the present invention to provide a centering system for the rubber elements of universal joint shafts and the like, which will overcome the above mentioned drawbacks.

It is another object of this invention to provide a centering system for rubber elements of universal joint shafts and the like, which will be highly reliable, allow an increase in the speed of rotation of the shaft and will also avoid the occurrence of oscillations at various speed ranges.

These and other objects and advantages of the invention will appear more clearly from the following specification in connection with the accompanying drawing, in which:

FIGS. 1 to 3 diagrammatically and in section illustrate three different embodiments of the present invention.

In order to realize the above outlined objects, according to the present invention, in addition to the customary rubber ring there is provided a pair of ball rings between the bell and the inner bushing, which pair of ball rings will bring about the centering of the rubber element. If desired, one of said ball rings may be made of synthetic material, preferably polyamide. Advantageously, the center of revolution of this centering device may either with a bending angle or with pre-loaded rubber element in the zero position of the joint be located in the center of gravity of said rubber element. However, the point of rotation of the centering system may also be located eccentrically with regard to the center of gravity of the rubber element.

Referring now to the drawing in detail and FIG. 1 thereof in particular, it will be noted that a rubber element 3 is located between the inner cylindrical member or bushing 1 of a joint for a universal joint shaft and the outer bell-shaped member or bell 2. This rubber element may in customary manner be surrounded by an outer metal ring 4. Rubber element 3 is preferably vulcanized to the inner bushing 1 and the outer ring 4. Bell 2 is in customary manner connected to a pipe 5 representing the universal joint shaft. This connection may be made for instance by welding.

In accordance with the present invention, between inner bushing 1 and bell 2 there is additionally arranged a pair of ball rings comprising an inner ring 6 and an outer ring 7. Inner ring 6 is connected to bushing 1, whereas outer ring 7 is connected to bell 2. Outer ring 7 may advantageously be made of a synthetic material for instance of a polyamide.

When the joint of FIG. 1 is in its zero position, the center 8 of the radius R of the pair of ball rings is located near the center of gravity 9 of the rubber element 3. These two points 8 and 9 will coincide only at a bending angle of approximately 2°.

The arrangement of FIG. 2 is similar to that of FIG. 1 and, therefore, corresponding elements have been designated with the same reference numerals as in FIG. 1.

In contradistinction to the arrangement of FIG. 1, the centering system of FIG. 2 is form-locked, i.e. positive, whereby the center 8 of the radius of curvature R of the pair of ball rings 6a and 7a will be located eccentrically with regard to the center of gravity of the rubber element 4.

The two rings 6a and 7a are connected to each other due to their ball-shaped contour. The embrace of the inner ring 6a by the outer ring 7a may be obtained by employing a suitable synthetic material for the outer ring. As such synthetic material may advantageously be selected polyamide.

However, if desired, the outer ring 7a may also be provided with slits for facilitating the installation of the joint.

FIG. 3 shows still another embodiment of the present invention. According to this embodiment, when pressing the rubber body 3 into the bell 2, said rubber body will be preloaded so that a proper power flow will be assured at all times between the inner ring 6b and the outer ring 7b. With this arrangement, therefore, already in the zero position of the joint, the center of gravity 9 of the rubber element 3 will coincide with the center of revolution 8.

It is, of course, to be understood that the present invention is, by no means, limited to the particular constructions shown in the drawing but also comprises any modifications within the scope of the appended claims. Thus, while poylamide has proved highly successful as material for one of the ball rings, it is, of course to be understood that also other materials may be used for this purpose, as for instance bronze or hardened steel.

What I claim is:

1. In a centering arrangement especially for use in connection with a universal joint shaft: an inner cylindrical member, an outer bell-shaped member arranged in radially spaced relationship to and around said inner cylindrical member, an annular rubber element confined between said inner cylindrical member and said outer bell-shaped member and being mounted on said inner cylindrical member in spaced relationship to one end portion of said inner cylindrical member, said one end portion being surrounded by said outer bell-shaped member, an inner ring mounted on and connected to said one end portion, and an outer ring mounted on the inside of and connected to said bell-shaped member, said rings contacting each other along a spherical surface.

2. In a centering arrangement especially for use in connection with a universal joint shaft: an inner cylindrical member, an outer bell-shaped member arranged in radially spaced relationship to and around said inner cylindrical member, said bell-shaped member having a hollow shank section surrounding one end portion of said inner cylindrical member in spaced relationship thereto and having a hollow skirt section of a larger diameter than said shank section and extending in the direction toward the other end portion of said inner cylindrical member, a ring mounted within said skirt section, an annular rubber element confined between said ring and said inner cylindrical member and being mounted on said inner cylindrical member in spaced relationship to said one end portion of said inner cylindrical member, and a pair of centering rings respectively connected to said one end portion and said shank section and contacting each other along a spherical surface.

3. In an arrangement according to claim 1, in which one of said rings consists of a polyamide.

4. In a centering arrangement especially for use in connection with a universal joint shaft: an inner cylindrical member, an outer bell-shaped member arranged in radially spaced relationship to and around said inner cylindrical member, said bell-shaped member having a hollow shank section surrounding one end portion of said inner cylindrical member in spaced relationship thereto and having a hollow skirt section of a larger diameter than said shank section, an annular rubber element confined between said skirt section and said inner cylindrical member and being mounted on said inner cylindrical member in spaced relationship to said one end portion of said inner cylindrical member, and a pair of centering rings respectively connected to said one end portion and said shank section and contacting each other along a spherical surface having its center coinciding with the center of gravity of said rubber element at a certain angle of inclination between said inner cylindrical member and said bell-shaped member.

5. In a centering arrangement especially for use in connection with a universal joint shaft: an inner cylindrical member, an outer bell-shaped member arranged in radially spaced relationship to and around said inner cylindrical member, said bell-shaped member having a hollow shank section surrounding one end portion of said inner cylindrical member in spaced relationship thereto and having a hollow skirt section of a larger diameter than said shank section, an annular rubber element confined between said skirt section and said inner cylindrical member and being mounted on said inner cylindrical member in spaced relationship to said one end portion of said inner cylindrical member, and a pair of centering rings respectively connected to said one end portion and said shank section, and contacting each other along a spherical surface having its center coinciding with the center of gravity of said rubber element when said inner cylindrical member and said outer bell-shaped member are in coaxial alignment with each other.

6. In a centering arrangement especially for use in connection with a universal joint shaft: an inner cylindrical member, an outer bell-shaped member arranged in radially spaced relationship to and around said inner cylindrical member, said bell-shaped member having a hollow shank section surrounding one end portion of said inner cylindrical member in spaced relationship thereto and having a hollow skirt section of a larger diameter than said shank section, an annular rubber element confined between said skirt section and said inner cylindrical member and being mounted on said inner cylindrical member in spaced relationship to said one end portion of said inner cylindrical member, and a pair of centering rings respectively connected to said one end portion and said shank section, and contacting each other along a spherical surface having its center arranged eccentrically with regard to the center of gravity of said annular rubber element.

References Cited in the file of this patent

UNITED STATES PATENTS

| | | |
|---|---|---|
| 1,606,514 | Crist | Nov. 9, 1926 |
| 2,154,077 | Sampson | Apr. 11, 1939 |
| 2,814,538 | Connolly | Nov. 26, 1957 |

FOREIGN PATENTS

| | | |
|---|---|---|
| 691,589 | Germany | May 31, 1940 |